(12) United States Patent
Davis et al.

(10) Patent No.: US 10,107,325 B2
(45) Date of Patent: Oct. 23, 2018

(54) MULTIFUNCTION REACTION WASHER AND STACK ACCESSED BY SLIM REACTION SOCKET

(71) Applicants: John D. Davis, Las Vegas, NV (US); Johannes P. Schneeberger, Brisbane, CA (US)

(72) Inventors: John D. Davis, Las Vegas, NV (US); Johannes P. Schneeberger, Brisbane, CA (US)

(73) Assignee: The Reaction Washer Company, Springville, UT (US)

( * ) Notice: Subject to any disclaimer, the term of this patent is extended or adjusted under 35 U.S.C. 154(b) by 146 days.

(21) Appl. No.: 14/932,768

(22) Filed: Nov. 4, 2015

(65) Prior Publication Data
US 2017/0122361 A1    May 4, 2017

(51) Int. Cl.
*F16B 39/24* (2006.01)
*F16B 23/00* (2006.01)
*F16B 39/26* (2006.01)

(52) U.S. Cl.
CPC .......... *F16B 39/24* (2013.01); *F16B 23/0061* (2013.01); *F16B 39/26* (2013.01)

(58) Field of Classification Search
CPC ....... F16B 39/24; F16B 23/00; F16B 23/0061
USPC ......... 411/147, 149, 160–164, 402, 409, 435
See application file for complete search history.

(56) References Cited

U.S. PATENT DOCUMENTS

| | | | |
|---|---|---|---|
| 3,581,383 A | 6/1971 | Tadahara | |
| 3,633,446 A | 1/1972 | Tadahira | |
| 3,895,663 A * | 7/1975 | Bashline | F16B 39/24 411/136 |
| 4,283,091 A * | 8/1981 | Enders | B60B 3/165 301/35.622 |
| 5,626,449 A * | 5/1997 | McKinlay | F16B 39/282 411/136 |
| 6,039,524 A * | 3/2000 | McKinlay | F16B 39/282 411/136 |
| 6,776,565 B2 * | 8/2004 | Chang | F16B 39/282 411/136 |
| 7,261,506 B2 * | 8/2007 | Smolarek | F16B 39/24 411/114 |
| 8,631,724 B2 * | 1/2014 | Miyata | B25B 13/488 411/161 |
| 2007/0243040 A1 * | 10/2007 | Chen | F16B 39/282 411/161 |

(Continued)

*Primary Examiner* — Flemming Saether

(57) ABSTRACT

Accurate reaction socket access within an outer washer diameter is provided via a number of tool access castles extending from a stepped bushing and serration top, which in turn provides low friction during initial tightening and securing after final loading of a nut/bolt. Bottom serration slipping during initial tightening and thread locking during initial loosening are eliminated by the reaction washer stacked on top and in contact with a support washer via helical ramps and ramp mates. During initial tightening or loosening, the ramp mates slide up or down the helical ramps whereby an axial load on the nut/bolt is ramped up or down prior to screwing it on the main thread. A clamp ring or ramp indenters may secure the two washers. An interposition washer may extend the axial reaction range of the washer stack. Direct tension indicators may be combined with the ramp indenters.

4 Claims, 17 Drawing Sheets

(56) References Cited

U.S. PATENT DOCUMENTS

2009/0003960 A1\* 1/2009 Lin ............................ F16B 39/24
                                                                411/161
2016/0375563 A1\* 12/2016 Junkers .................... B25B 21/02
                                                                 81/467

\* cited by examiner

MULTIFUNCTION REACTION WASHER AND STACK ACCESSED BY SLIM REACTION SOCKET

FIELD OF INVENTION

The present invention relates to reaction washers that support a nut or bolt head and that are held on to by a reaction socket to transfer a reaction torque from tightening or loosening the nut or bolt head.

BACKGROUND

A nut or bolt head may be tightened by a power torque wrench while transferring the counteracting reaction torque onto a washer beneath that nut or bolt head. This provides for a balanced, localized overall torque transfer that is self centering and does not require the need to manually oppose the actuation torque or support the power torque wrench eccentrically via a reaction member. It has been first described and claimed in a Japanese Patent Application and following U.S. Pat. No. 3,581,383. Reaction washers commercially available at the time of this invention are direct representations or obvious variations there from.

A reaction washer transfers the received reaction torque onto a resting surface beneath. From the resting surface, the reaction torque is transferred onto a thread hole, bolt or thread stud via which it counteracts the actuation torque exerted on the tightening element as is well known in the art. To avoid slipping and effectively transfer the reaction torque onto the resting surface, reaction washers commonly employ serrations on its bottom to bite into the resting surface. In order for these bottom serrations to bite, a contact force must be induced during initial tightening that is large enough for a given overall contact area of the bottom serrations to penetrate into the resting surface. Only then, the reaction washer won't slip and spin when the power tool starts to apply torque to the nut and/or bolt head while withholding itself via a concentric reaction socket on the reaction washer.

The friction on the reaction washer top has to be substantially lower than on the reaction washer bottom to prevent the reaction washer to be rotated with the nut instead of biting into the resting surface during initial manual tightening. This is particularly problematic in real world applications where the resting surface may be coated with oil or paint for corrosion protection. To keep the friction at the washer top to a minimum, it is commonly made smooth and hard, which bears the risk of the nut or bolt head becoming inadvertently loose. This substantially reduces the feasibility of prior art reaction washers for securing nuts and bolt heads. Moreover, the employment of additional well known safety washers in between the nut or bolt head and the reaction washer is prohibitive as it might cause the reaction washer to be dragged along during initial tightening instead of biting into the resting surface. Therefore, there exists a need for a reaction washer that maximizes bite at its bottom and provides low friction on its top during initial tightening and that secures the nut and/or bolt head after fully tightening it. The present invention addresses this need.

Reaction washers commonly feature a circumferential spline via which the reaction torque is radially transferred by a reaction socket that encompasses the reaction washer when coupled together. The radial torque transfer results in substantial radial forces especially in case of a loosely coupling wave shaped spline as is common in prior art reaction washers. To withstand those radial forces, the reaction socket has to have a substantially larger outer diameter at its bottom, which in turn increases the required clearance around the nut and/or bolt head to be tightened or loosened via a reaction washer. Also, debris and eventual paint tends to accumulate in the bottom corner around the reaction washer and the resting surface. This reduces the accessibility of the circumferential reaction washer spline particularly during loosening when increased reaction torque may need to be applied for snapping free the nut and/or bolt head. Further more, the shallow reaction washer spline of prior art reaction washers bears the risk of the reaction socket to snap off particularly during peak torque transfer were the spline and reaction socket may elastically deform. Therefore there exists a need for a reaction coupling of a reaction washer that does not produce substantial radial forces in the reaction coupling, that provides for a reaction coupling outer diameter at its bottom that does not exceed the outer diameter of the reaction washer, that is insensitive to eventual debris and/or paint accumulation along the outer bottom contour of the reaction washer and that provides for a secure axial coupling of the reaction socket to prevent it snapping off during peak torque transfer. The present invention addresses also this need.

Corrosion, paint and/or debris may impair a snug fit between the reaction washer and the reaction socket to the extent that the required reaction torque for loosening the nut and/or bolt head cannot successfully be transferred any more. Therefore, there exists a need for an axially reacting washer stack system that covers the reaction coupling. The present invention addresses also this need.

The circumferential spline of prior art reaction washers can be accessed from both axial sides of the reaction washer. Consequently, such prior art reaction washers may be inadvertently assembled upside down with the bottom serrations engaging with the nut and/or bolt head while the smooth reaction washer top comes in contact with the resting surface. Inadvertent inverted assembly of reaction washers makes them inoperative. Therefore, there exists the need for a reaction washer and/or axially reacting washer stack with reaction coupling configuration that can be axially accessed only from one intended side thereby eliminating unintentional wrong positioning of it. The present invention addresses also this need.

With increasing bolt diameter and/or elastically deflecting resting surfaces, the initially established axial force during manual pre tightening is commonly insufficient for the bottom serrations to bite. As an unfavorable result, in real world applications of large sized nuts or bolts with eventually oiled, coated and/or elastically deflecting resting surfaces, prior art reaction washers tend to slip during initial power assisted tightening. Therefore, there exists a need for a reaction washer integrated in or combined with an axially reacting washer stack that in response to an initially receiving reaction torque automatically ramps up axial contact force at the begin of power tool induced tightening and thereby secure sufficient bite into the resting surface. The present invention addresses also this need.

Bolts and nuts commonly experience a substantial increase of friction coefficient in their main threads between tightening and loosening of them. This may be caused by corrosion, heat induced coking of lubricant and/or galing of the main thread as is well known in the art. The torque required to loosen loaded nuts and bolts having increased thread friction may exceed structural limits of the bolt shaft and/or of the actuation coupling of the nut or bolt head making it impossible to disassemble it nondestructively. Therefore, there exists a need for a reaction washer integrated in or combined with an axially reacting washer stack that receives a reaction torque and automatically axially ramps down the axial load and related load friction in the main thread on tightened nuts and/or bolts during initial power tool induced loosening of them. The present invention addresses also this need.

Prior art direct tension indicating washers are employed and very practical to identify and inspect whether or not a nut and/or bolt head has been tightened in general and tightened with a minimum required torque in particular. As reaction washers are very convenient for tightening and/or loosening nuts and/or bolt heads, there exists a need for a reaction washer integrated in and/or combined with a reacting washer stack that provides also direct tension indication. The present invention addresses also this need.

SUMMARY

A reaction washer is axially one sided accessible for a reaction socket via a number of tool access castles that are arrayed along the circumference and extend upward or downward away from the washer top. Inadvertent wrong upside down assembly of the reaction washer is thereby prevented. Due to axially extending tool access castles, the reaction socket is engaging with them while its bottom outer diameter does not exceed that of the reaction washer.

This provides for a slim reaction socket that eliminates the need for additional assembly clearance around the reaction washer. The tool access castles also feature undercutting grooves for the reaction socket to axially interlock prior to torque transfer. A simple lock on of the power torque wrench is thereby established that prevents it from snapping off at peak torque transfer. The axial interlocking makes the reaction torque transfer interface between reaction socket and reaction washer also substantially more tolerant to elastic deformation without risk of snapping off.

A central initial bushing face may be positioned on the washer top radially inside and axially above rotation stop serrations. During initial manual tightening with the primary goal of the reaction washer biting into the resting surface, the initial bushing face provides low friction transfer of the axial force exerted on it via the rotating nut or bolt head. In addition to the low friction, the centrally positioning of the initial bushing face in a minimum distance around the washer axis further reduces the resulting friction torque on the reaction washer. On the washer bottom, peaked forms such as spikes are arrayed at a maximum distance around the washer axis. The combination of minimum radius initial bushing face and maximum radius of minimum bottom bite peaks effectively eliminates slipping and facilitates successful bite of the reaction washer into the resting surface.

To secure the tightened nut or bolt head, the reaction washer may feature circumferential serrations to bite into a clamp ring pushed over them while engaging with the nut or bolt head. Alternately or in addition, the reaction washer may feature rotation stop serrations on the top face slightly below the initial bushing face. Following initial tightening, the initial bushing face may either deflect or indent into the nut or bolt head while the full tightening torque is applied. The nut or bolt head consequently presses into the rotation stop serrations which may prevent the nut or bolt head to inadvertently become loose.

In case insufficient initial bite force is applicable during manual pre tightening, the reaction washer may be integrated in or combined with an axially reacting washer stack including a support washer below the reaction washer and a torsion lift interface in between them. The torsion lift interface features a number of helical ramps and ramp mates. The helical ramps and ramp mates are facing and in contact with each other while the washers are stacked. During initial tightening or loosing via the reaction socket reaction coupled with the reaction washer, the ramp mates slide up or down the helical ramps. The reaction washer is thereby rotated with respect to the support washer around the washer axis in a helical movement and correspondingly axially reacted along the washer axis. The reaction torque is opposing the actuation torque on the nut or bolt head.

During helical movement and axial reaction of the top washer, nut or bolt head may not be rotated yet. Axial bite force is thereby ramped up during tightening. Likewise and during loosening, axial main thread load is ramped down. The axial reaction load causes the ramp friction in the torsion lift interface as well as the friction in the main thread interface to increase. Friction in the main thread interface is initially higher due to the common thirty degree thread flank angle, whereas the helical ramps are flat. Instead of the prior art issue of the high thread friction causing the reaction washer to slip, in the present invention the slippage occurs in the torsion lift interface that has a lower friction than the serrated support washer bottom on the resting surface. The torsion lift interface slippage causes the top washer to rotate initially on the support washer while the nut or bolt head stands still. During top washer rotation and its helical relative movement on the support washer, axial load and friction in the main thread may increase linearly and proportional while the much smaller axial contact area in the torsion lift interface may shift to a more than proportional friction increase due to substantially higher contact pressures. This may cause the top washer to stop rotating at some point while the nut or bolt head continues to screw on the main thread during tightening. At that washer stop level, the axial reaction force has ramped up to a level at which the support washer securely bites into the resting surface and the reaction torque may be transmitted without risk of the support washer slipping.

The torsion lift interface may further feature a ramp lift stop that has contacting features on both washers enabling the ramp lift stop to limit the angular rotation of the washers with respect to each other. Also, one or more interposition washers may be stacked in between the top washer and support washer to increase the axial reaction height of the axially reacting washer stack. A tightening element such as a nut and/or bolt head that is resting on the top reaction washer may thereby by axially lifted and preloaded to a varying degree at the begin of a power tool induced and reaction coupled tightening of the tightening element.

A clamp ring may also be employed to secure the support washer with the top reaction washer or the nut or bolt head and at the same time cover the axial reacting washer stack and the reaction coupling. The clamp ring may be axially push assembled or circumferentially tightened. The washers may alternately be secured with each other via indenters that slide along the helical ramp during initial reaction coupled tightening and are pressed into the helical ramps once the helical relative movement of the top reaction washer on the support washer has ramped up axial load to a washer stop level. The indenters may be combined with direct tension indicators in the torsion lift interface.

The axial reacting washer stack may be part of a system including a concentric socket tool with an inner actuation socket that is accessing and actuating the tightening element and an outer reaction socket that is accessing and reacting onto the reaction washer or axially reacting washer stack. The concentric socket tool may be coupled to a well known power torque wrench such as a hydraulic, pneumatic and/or electric torque wrench. After initial manual assembly of the tightening element with it resting on the axially reacting washer stack, the concentric socket tool is axially coupled with the tightening element and the reaction washer or top washer. Once the power wrench is initiated, the hooking noses of the reaction socket initially engage and axially lock on the power wrench immediately prior to torque transfer. Next and as the power wrench continues to rotate the inner actuation socket with respect to the outer reaction socket, the ramp mates slide up on the helical ramps in a helical relative movement around the washer/tightening axis inducing an axial displacement between the pre tightened tightening element and the resting surface. Depending on the stiffness in the tightening assembly, the helical relative movement continues over a number of degrees until axial loading and the corresponding ramp friction between the helical ramps and the ramp mates reaches a washer stop level. At the washer stop level, the ramp friction has become sufficiently high to transfer the reaction torque from the top washer onto the support washer. In case the resting surface resilience exceeds the axial reaction range of a single torsion lift interface, the washer stop level may not be reached before the ramp mates reach the ramp lift stop. In that case, one or more interposition washers may be employed thereby multiplying the number of torsion lift interfaces and overall axial reaction range.

Once the tightening element is tightened with the predetermined torque, the concentric socket tool is removed and circumferential lock ring assembled over the axially reacting washer stack. To loosen the tightening element again, the circumferential lock ring is initially removed and the concentric socket tool applied again. In case the friction in the main tightening thread has increased since tightening, the initial loosening torque applied between the inner and outer sockets causes the ramp mates to slide down the helical ramps and ramp down the axial load and thread friction in the main thread such that the tightening element may be non destructively disassembled. In case of ramp indenters, their indentation profile may be configured to provide a predetermined unlocking torque to break them free on the helical ramp they have indented on.

The direct tension indicators may directly indicate at least a predetermined minimum axial load reached during tightening. At the same time, the power torque wrench that is reaction coupled with the reaction washer may provide an accurately adjustable maximum actuation torque, which together with the direct tension indicator gives precise information about a maximum and minimum axial bolt tension that has been applied irrespective of unknown friction in the tightening assembly.

DETAILED DESCRIPTION

Figure 1A:
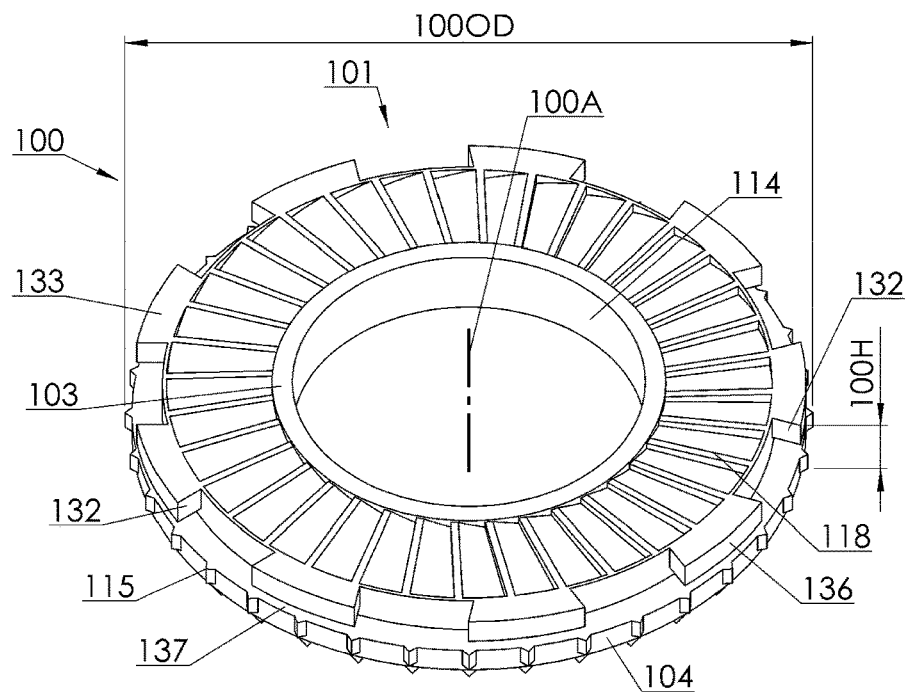
FIG. 1A is a first top down perspective view of a reaction washer with recessed tool access castles according to a first embodiment of the invention.
Figure 1B:
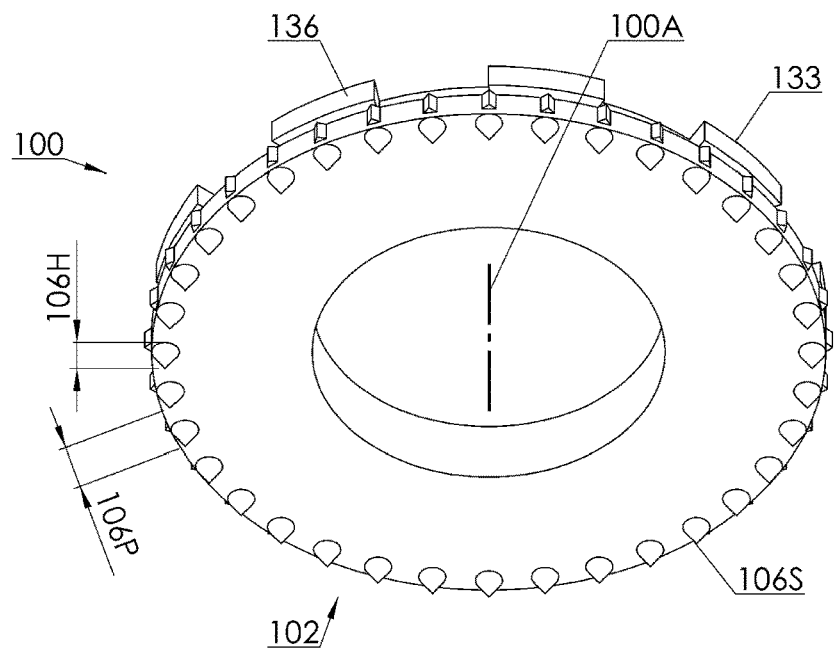
FIG. 1B is a first bottom up perspective view of the first embodiment of the invention of FIG. 1A.

For the purpose of ease of understanding, numerals in the Figures and Specification separated by comma denote an accumulation of the respective items, numerals separated by forward slash denote alternate respective items and numerals separated by dash denote interactions such as contacting, mating, coupling and/or interlocking of the respective items. In the Figures, numerals in between brackets pertain to optional items not depicted. In the Specification, numerals in between brackets pertain to optional and/or grouped items.

As in FIGS. 1A,1B,3A,3B,3C, a reaction washer 100/300 may have a top face 101, a bottom face 102, a washer body 110 and a number of tool access castles 133 that are circumferentially arrayed with respect to a washer axis 100A. The tool access castles 133 are extending away from the top face 101 and within and up to an outer washer diameter 100OD/300OD of the reaction washer 100/300. In the first embodiment as in FIGS. 1A, 1B, at least one but preferably all tool access castles 133 are extending downward away from the top face 101. In the third embodiment as in FIGS. 3A, 3B, 3C, at least one but preferably all tool access castles 133 are extending upward away from the top face 101. At least one but preferably all tool access castles 133 have a lock-on groove 137 that is circumferentially at least partially undercutting the tool access castles 133. In the first embodiment, the lock-on groove 137 may be encompassing the entire reaction washer 100.

The bottom face 102 may be radially extending up to the outer washer diameter 100OD/300OD. A number of bite spikes 106P may be circumferentially arrayed on the bottom face preferably immediately adjacent the outer washer diameter 100OD/300OD. Biting may be provided by the bite spikes 106S with pointed tips as in FIGS. 1A,1B or by tip ridges 106R as in FIGS. 3B,3C.

In the first embodiment, the reaction washer 100 may accommodate within its height 100H for the radially flush bottom face 102, eventual vertical serrations 115 along the washer circumference, the lock-on groove 137 and the recessed tool access castles 133. The accommodating overall washer height 100H may result in a sufficiently stiff reaction washer 110, such that a main axial tightening load received on the washer top 101 may be directed onto the peripheral bite spikes 106S. As a favorable result of the bite spikes 106S biting into their resting surface 61 in a maximum distance to the washer axis and tightening axis 100A, the reaction torque RT received by the tool access castles 133 is transferred onto the resting surface 61 with minimum risk of washer slippage as shown in FIGS. 7A-7D. The bite spikes 106S may be straight downward extending for maximum rigidity in order to successfully penetrate and be sparsely arrayed with a spike pitch 106P between them that may be a multiple of a bite spike height 106H. The bite spike height 106H may be selected in conjunction with fabrication technique, application and size of the reaction washer 100. The bite spike height 106H may be up to at least 1/16 inch. Furthermore, bite spike pitch and height 106P, 106H may be selected for the bite spikes 106S to penetrate though corrosion, paint and/or lubricant layers and/or to bite into soft and/or brittle materials such as plastic, composites, ceramic, fiber boards, wood, concrete, and/or rock.

The bite-no-slip performance of the bite spikes 106S may be further improved by the central bushing face 103 providing initial low friction sliding contact with a tightening element 50 in closest distance to the tightening axis 100A. The resulting low friction torque is particularly advantageous prior to the bite spikes/ridges 106S/106R penetrating into the resting surface 61. Hence, the combination of central bushing face 103 and peripheral sparse bite spikes 106S minimizes the risk of slippage. During full loading, the narrow bushing face 103 may either be of a soft low friction material such as Teflon that deflects under load such that surrounding rotation stop serrations 118 come into load bearing contact with the tightening element 50. Alternately, the central bushing face 103 may be monolithically fabricated together with the reaction washer 100. In that case, it may be sufficiently narrow dimensioned to penetrate into the tightening element 50 during full tightening of it, making again the rotation stop serrations 118 to engage with the tightening element 50.

In the third embodiment, the washer body 110 may be configured as a disk spring. The rotation stop serrations 118 may be positioned in a trough of the top face 101 such that they axially at least partially overlap with the bite spikes 106S or bite ridges 106R and such that they are below and surrounding the central bushing face 103 while the disk spring washer body 110 is load free. During full tightening of the nut or bolt head 50, the disk spring washer body 110 may be loaded to the extent that it is flattened and the rotation stop serrations 118 may become at least level with the central bushing face 103. In this flat loaded condition, the rotation stop serrations 118 may become load bearing and may transfer the receiving load axially direct onto the bite spikes 106S or ridges 106R beneath. By adjusting the deflection height 110H and the bushing face height 103H, load distribution between bushing face 103 and rotation stop serrations 118 may be modulated. If deflection height 110H is selected larger than bushing face height 103H, flattening load is mainly transferred via rotation stop serrations 118 and bite spikes/ridges 106S/106R resulting in maximum securing against inadvertent loosening at the expense of increased friction between the nut or bolt head 50 and washer top 101 and vice versa.

In case sufficient axial force and bite of the bite spikes/ ridges 106S/106R during initial manual screwing on cannot be established in the first and third embodiments, the reaction washer 100/300 may be integrated in or combined with an axially reacting washer stack 200/400/500/600. As in FIGS. 2A-2D, the reaction washer 100 is integrated in the axially reacting washer stack 200. It features a top washer 210, a support washer 220, a reaction coupling in the preferred configuration of the tool access castles 133, a torsion lift interface 203-207 and preferably a ramp lift stop 211-212. Part of the torsion lift interface 203-207 are a number of helical ramps 203 circumferentially oriented around the washer stack axis 100A on at least one but preferably both of the top washer 210 and the support washer 220.

A helical relative movement of the top washer 210 with respect to the support washer 220 may be established by any feature of one of the two washers 210, 220 sliding or rolling on a helical ramp 203 of one other of the two washers 120, 110. Snug area contact may be established at least by correspondingly shaped and oppositely contacting helical ramps 203. In case of a ramp mate 207 sliding on an opposite helical ramp 203, the ramp mate 207 may likewise be correspondingly shaped to the respective helical ramp 203 for a snug contact and even contact stresses.

At least one but preferably a number of helical ramps 103 are arrayed around the washer stack axis 100A for a circumferentially balanced axial load transfer between the washers 210, 220. Having the helical ramps 203 contacting directly results in contact stresses between them that vary for a given load depending on the angular relative orientation of the oppositely mating helical ramps 203. Also, the helical ramps 203 may slide off each other if the top washer 210 is rotated with respect to the support washer 220 inaccurately and in excess of the angular ramp extension 206. Reaction torque RT and a predetermined reaction socket 30 torsion angle may be accurately transferred from a power torque wrench 90 via a reaction socket 30 onto the top washer 210 via direct circumferential reaction coupling 32-132 between reaction socket 30 and tool access castles 133 as shown in FIG. 7C. The reaction socket 30 may be coupled to the housing of the power torque wrench 90 such that the predetermined reaction socket 30 torsion angle may be externally induced to the power torque wrench 90 around the tightening axis 100A. Inadvertent rotation of the top washer 210 in excess of the angular ramp extension 206 may be avoided.

Instead of externally applying a predetermined reaction socket 30 torsion angle in a controlled fashion, the axial reaction washer system 10 may be operated in a self adjusting manner without externally controlling the reaction socket 30 torsion angle. In that case, a number of ramp rotation stops 211-212 including a first ramp top stop face 211 and an oppositely mating second ramp top stop face 212 may be additionally part of the torsion lift interface 203-207. The ramp stops 211-212 may structurally limit the rotational movement between the top washer 210 and the support washer 220 to at least within the angular ramp extension 206. In the embodiments where the helical ramps 203 operate in conjunction with ramp mates 207 employed together, first and second ramp top stop faces 211,212 may be circumferentially interposed alternately with ramp mates 207 and lower ramp end faces 225 as shown in FIGS. 2A, 5, 6A, 6B.

The helical ramps 203 may be part of at least one but preferably both the top washer 210,410 and the support washer 220,420. Likewise, the ramp mates 207 may be part of at least one other but preferably both the top washer 210,410 and support washer 220,420. The ramp mates 207 may be correspondingly shaped to the respective opposite helix ramp 203 for a snug contacting and even stress distribution between them. In addition, the ramp mates 207 with their angular mate extensions 209 provide a constant ramp contact area 207C with the opposite helical ramps 203 irrespective the rotational orientation of the top washer 210,410 relative to the support washer 220,420. In the case shown in FIG. 4B of a torsion lift interface 203-203 including only snug contacting helical ramps 203A,203B, a maximum unstopped angular torsion angle 205A of the top washer 210,410 relative to the support washer 220,420 is the angular ramp extension 206 minus a safety margin. In case of the torsion lift interface 203-207 including helical ramps 203 and ramp mates 207, a maximum stopped angular torsion range 205B of the top washer 210,410 relative to the support washer 220,420 is the difference of the angular ramp extension 206 minus angular mate extension 209.

An outer socket bottom diameter 35OD of the reaction socket bottom 35 is kept within and up to an outer washer or washer stack diameter 100OD/200OD/300OD by having the reaction coupling 133 featuring the tool access castles 133 circumferentially arrayed with respect to the washer stack axis 100A and extending away from a top face 201 of the top washer 210 also within and up to the outer washer stack diameter 200OD/300OD similar as taught for reaction washers 100,300. As in FIGS. 2A-2D,5,6A-6E the tool access castles 133 are extending downward away from the top face 201. There, a circumferential groove 137 is at least partially but preferably continuously undercutting the outside 136 of the tool access castle 133. As in FIGS. 3A-3C, 4A,4B, the tool access castles 133 are extending upward away from the top face 201. The tool access castles 133 may be part of a separate crown washer 310 that is on top of and rotationally coupled with the top washer 210. The crown washer 310 may feature at least the tool access castles 133 and a bottom coupling 107. Instead of the crown washer 310, a reaction washer 100/300 may be employed whereby the bite spikes or ridges 106 may couple to correspondingly shaped coupling serrations 418 on the top washer 401. That way, the reaction washer 100/300 may be directly combined with the axially reacting washer stack 400 in a modular system.

The lock-on grooves 137 are preferably at least partially undercutting a side 132 of the tool access castles 133. The reaction socket 35 has circumferential hooking noses 37 as shown in FIGS. 7B,7C. The circumferential hooking noses 37 are correspondingly shaped and engaging with the lock-on grooves 137. Consequently, the reaction socket 30 is axially locked with the tool access castles 133 prior to transferring a reaction torque RT from the reaction socket 30 on the tool access castles 133. This advantageously eliminates the risk of the reaction socket 30 and attached power torque wrench 90 to snap off the tool access castles 133 during transfer of actuation and reaction torque AT, RT. In conjunction with recessed tool access castles 133, the continuous undercutting circumferential lock-on grooves 137 may be conveniently fabricated by well known turning operations. In conjunction with raised tool access castles 133, the partially circumferentially undercutting lock-on grooves 137 may be conveniently fabricated by well known T-slot milling, stamping and/or deep drawing. The entire reaction washer 300 and/or the crown washer 310 may be fabricated by stamping and deep-drawing as is well known in the art. Similarly, torsion stop washers 430 depicted in FIG. 4B with their torsion stop castles 433 may also be conveniently mass fabricated by stamping and deep drawing.

Figure 4A:
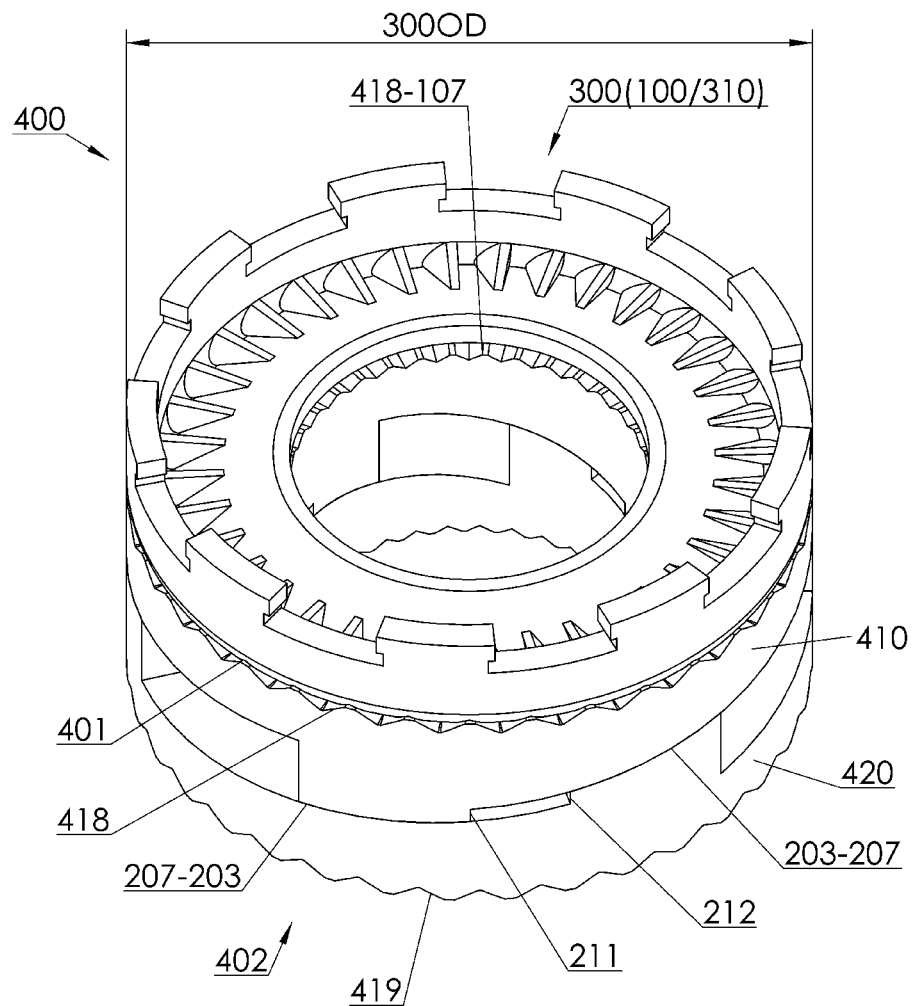
FIG. 4A is the first top down perspective view of the reaction washer of FIGS. 3A-3C being axially coupled and combined with an axially reacting washer stack with integrated rotation lift stop according to a fourth embodiment of the invention.
Figure 4B:
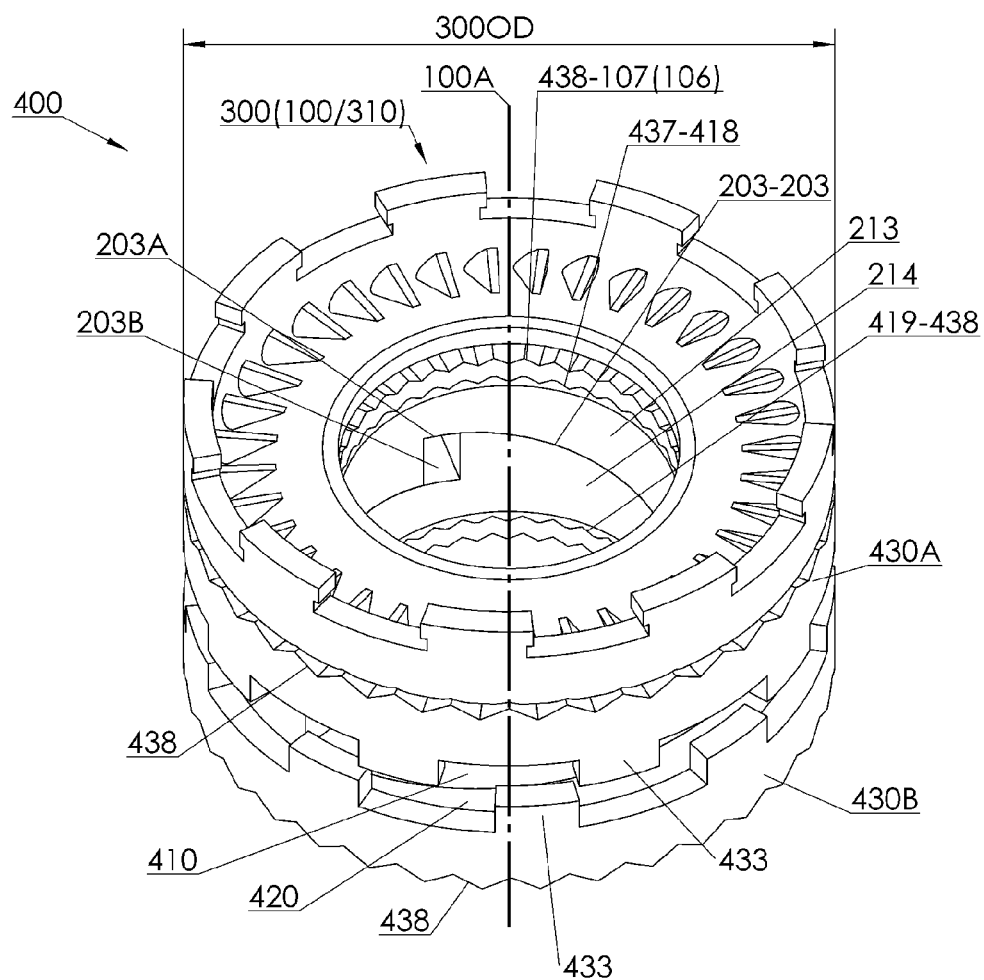
FIG. 4B is the first top down perspective view of the reaction washer of FIGS. 3A-3C being axially coupled and combined with an axially reacting washer stack with separate rotation lift stop according to a fifth embodiment of the invention.
Figure 5:
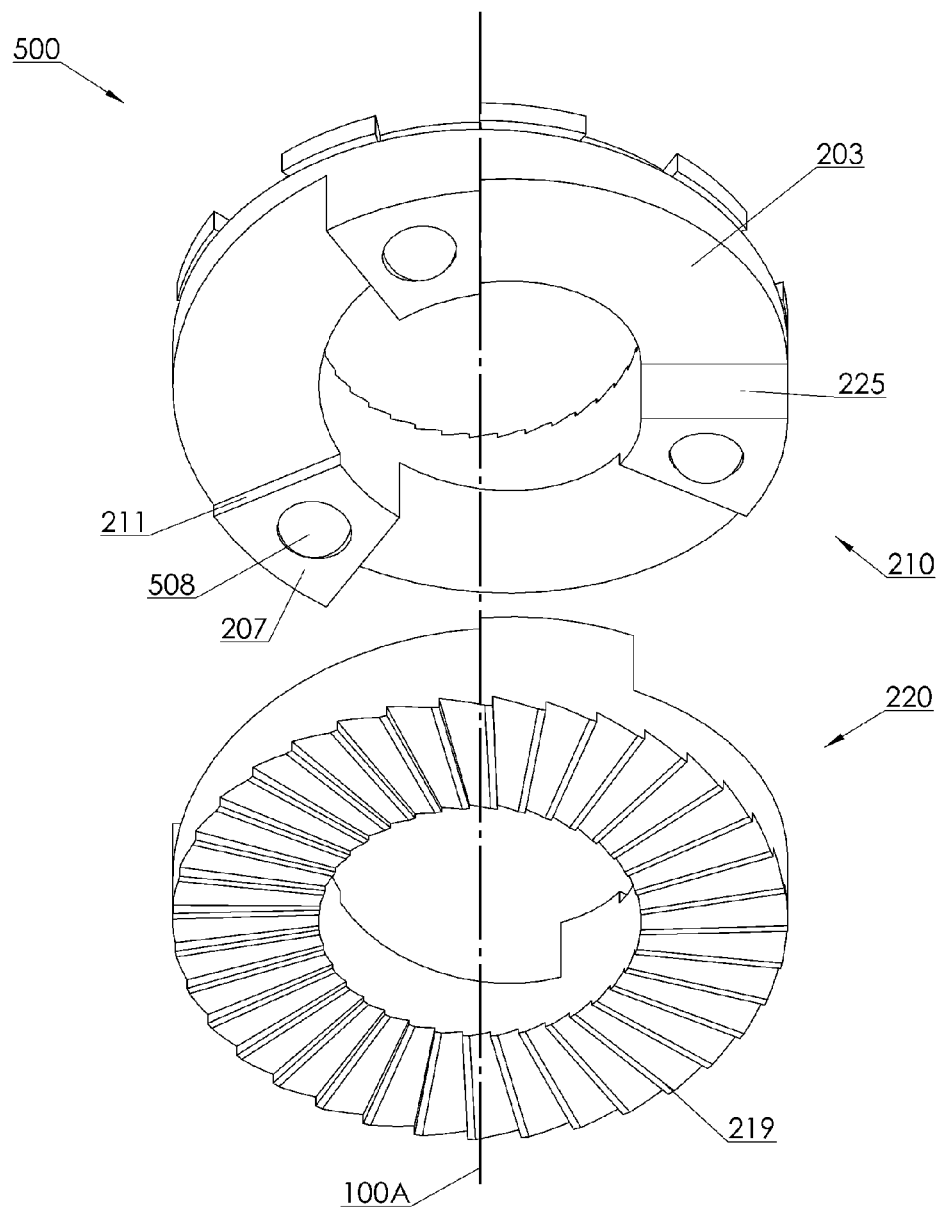
FIG. 5 is the first bottom up perspective view of a reaction washer integrated in an axially reacting washer stack in exploded arrangement with integrated rotation lift stop and ramp indenters according to a sixth embodiment of the invention.

In FIG. 4A, the reaction washer 100/300 or crown washer 310 is directly rotationally coupled with the top washer 110 via coupling serrations 107 or bite spikes/ridges 106S/106R engaging with top serrations 418 of the top washer 210. In FIG. 4B, the reaction washer 100/300 or crown washer 310 is indirectly rotationally coupled with the top washer 410 via lift stop washer 430A, whereby the coupling serrations 107 or bite spikes/ridges 106S/106R are engaging with stop washer outside serrations 438 and stop washer inside serrations 437 are engaging with top serrations 418.

As in FIG. 7B, the tool access castles 133 engage with the correspondingly shaped reaction interlocks 33 of the reaction socket 30 preferably within and up to the outer washer diameter 100OD/300OD or washer stack diameter 200OD. The outer bottom socket diameter 35OD that is within and up to the outer washer/washer stack diameter 100OD/300OD/200OD minimizes required access clearance for tightening and loosening a nut and/or bolt assembly 10 employed together with the reaction washer 100/300 and/or axially reacting washer stack 200/400/500/600.

The helical ramps 203 have a ramp angle 208 and an angular ramp extension 106 that may be limited by the ramp lift stops 211-212 defined by contacting of first and second ramp top stop faces 211,212. Alternately and as depicted in FIG. 4B, a ramp lift 433-433 stop may be provided by lift stop castles 433 of torsion stop washers 430A,430B. A first lift stop washer 430A may be encompassing and be rotationally coupled with the top washer 410 via stop washer inside serrations 437 in mating contact with top washer top serrations 418. A second lift stop washer 430B may be encompassing and may be rotationally coupled with the support washer 420 via stop washer inside serrations 438 in mating contact with support washer bottom serrations 419.

The lift stop washers 430A,430B may be identical, with their outside serrations 438 operating to couple with coupling serrations 107 or bite serrations 106 or to bite into the resting surface 61. In a variation of the fifth embodiment, the lift stop castles 433 may be integral part of top washer 410 and support washer 420 and circumferentially arrayed along their respective central holes 213,214 and/or around their respective outer circumferences.

The ramp lift stops 211-212/433-433 are enabled while opposing helical ramps 203A,203B or ramp mates 207 are in contact with opposing helical ramps 203 such that the helical ramps 203A,203B are confined to within maximum torsion angle 205A or ramp mates 207 are circumferentially confined within maximum torsion angle 205B and within the helical ramps 203. In that context, one of the opposing helical ramps 203A,203B may be considered equal the ramp mate 207.

As in FIGS. 7A-7D, the washer/washer stack axis 100A coincides with tightening axis 100A of the main thread 21 of the axial reaction washer system 10. A tightening element 50 such as a well known nut and/or bolt head has an actuation coupling 53 in the preferred form of a circumferential polygon such as a hex. The actuation coupling 53 is accessed by a mating actuation interlock 43 of an inner actuation socket 40. The tightening element 50 is resting on the top face 101/201/301. The tightening element 50 is screwed on a main tightening thread 21. The tightening element 50 may be rotationally actuated by the actuation torque AT produced by the power torque wrench 90. The actuation socket 40 may be encapsulated and concentric to the surrounding reaction socket 30. Both sockets 30, 40 may be part of a concentric socket tool 30-40 and/or attached to the power torque wrench 90. The power torque wrench 90 may be a well known hydraulic, pneumatic and/or electric torque wrench.

While the actuation torque AT is transferred onto the tightening element 50 via the inner actuation socket 40, the opposing reaction torque RT is rotationally oppositely transferred onto the reaction washer 100/300 or top washer 210 such that the tightening element 50 and the washer 100/300/210 are being rotated oppositely with respect to each other. If the washer 100/300/210 is rotationally held in place, the tightening element 50 rotates alone in one direction. If the tightening element 50 is rotationally held in place, the washer 100/300/210 rotates alone in the other direction.

In case of reaction washer 100/300, the bite spikes/ridges 106S/106R indent in the resting surface 61 during initial manual screw-on of the tightening element 50. During following final tightening with coupled actuation and reaction sockets 40,30, the reaction torque RT is slip free transferred via the reaction washer 100/300 biting into the resting surface 61 while the tightening element 50 is immediately tightened or loosened by the actuation torque AT.

The helical ramps 203 and ramp mates 207 may be preferably horizontal in radial direction and with a smooth surface that may be hardened and/or low friction coated. The helical ramps 203 may be also part of a well known flat or trapezoidal thread via which washers 210,220 may be interlocked. In a first system friction condition, the torsion lift interface 203-207/203-203 is configured with a beginning stiction that is lower than in between the support washer bottom 202/402 and the resting surface 61 and lower than in between the tightening element 50 and the main thread 21. In a second system friction condition, the torsion lift interface 203-207/203-203 is configured with a stopping resistance that at the washer stop level is still lower than stiction in between the support washer bottom 202/402 and the resting surface 61 and higher than stiction in between the tightening element 50 and the main thread 21. The second system friction condition may be met either by combining sliding in the torsion lift interface 203-203/203-207 with biting in between washer bottom 202/402 and resting surface or by combining rolling in the torsion lift interface 203-203/203-207 with biting or stiction in between washer bottom 202/402 and resting surface.

In case of axially reacting washer stacks 200/400/500/600 and once an actuation torque AT is induced onto the tightening element 50, the reaction torque RT is initially rotating the top washer 210/(310,(430),410) to slide along the helical ramps 103. The resulting helical relative movement between the washers 210/(310,(430),410) and 220/(420,(430)) continues until a ramp friction on the helical ramps 203 has increased up to a washer stop level at which the reaction torque RT is transferred onto the support washer 220/420. At that moment, axial bite force has also multiplied and the bite spikes 106, or bite serrations 219/438 have penetrated into the resting surface 61. Once the washer stop level is reached, the top washer 210/310,410 stops rotating and the tightening element 50 resting on the top washer 210/(310,(430),410) is further rotated by the actuation torque AT while the reaction torque RT is transferred across the top washer 210/(310, (430),410), the torsion lift interface 203-207/433-433 and the support washer 220/(420,(430)) onto the resting surface 61.

Preferably at least three helical ramps 203 are circumferentially arrayed on one or both washers 210,220 for a circumferentially balanced axial load transfer on one hand and for a predetermined ramp angle 208 a maximum axial reaction height 203H. In embodiments in which the washers 210,220 are secured following the final tightening in a separate step of applying the clamp ring 240/270, the ramp angle 208 may be up to below a well known stiction friction angle of the torsion lift interface 203-203/203-207. In embodiments in which the washers 210,220 are secured concurrently with the final tightening via indenters 508/607, the ramp angle 208 may be up to above the well known stiction friction angle in the torsion lift interface 203-203/203-207. For a given angular torsion range 205A/205B and a given ramp angle 208, a certain axial reaction height 203H is available by the axially reacting washer stack 200/400/500/600. As in FIG. 2D,6E, the axial reaction height 203H may be multiplied by a number of interposition washers 230 stacked in between the top washer 210 and support washer 220. At least torsion lift interfaces 203-203 but preferably torsion lift interfaces 203-207 including ramp lift stops 211-212 may be employed in between top washer 210 and interposition washer 230 as well as in between interposition washer 230 and support washer 220.

The top washer 210 and/or the tightening element 50 may be rotationally secured with the support washer 220 by a circumferential lock ring 140/170 that is rotationally locking together the top washer 110 and/or tightening element 251 on one axial side of it and the support washer 120 on the other axial side of it. For that purpose, the circumferential lock ring 240/270 may engage with a first circumferential lock feature 115 of the top washer 210 and/or the tightening element 50 and a second circumferential lock feature 217 of the support washer 220. The first circumferential lock feature 115 may be peripheral top serrations 115 and/or the tool access castles 133 and/or the actuation coupling 255. The second circumferential lock feature may be peripheral bottom serrations 217 that are vertically extending on a circumferential face 204 of the support washer 220. Similarly, the peripheral top serrations 115 may be vertically extending on a circumferential face 104 of the top washer 220.

Figure 2A:
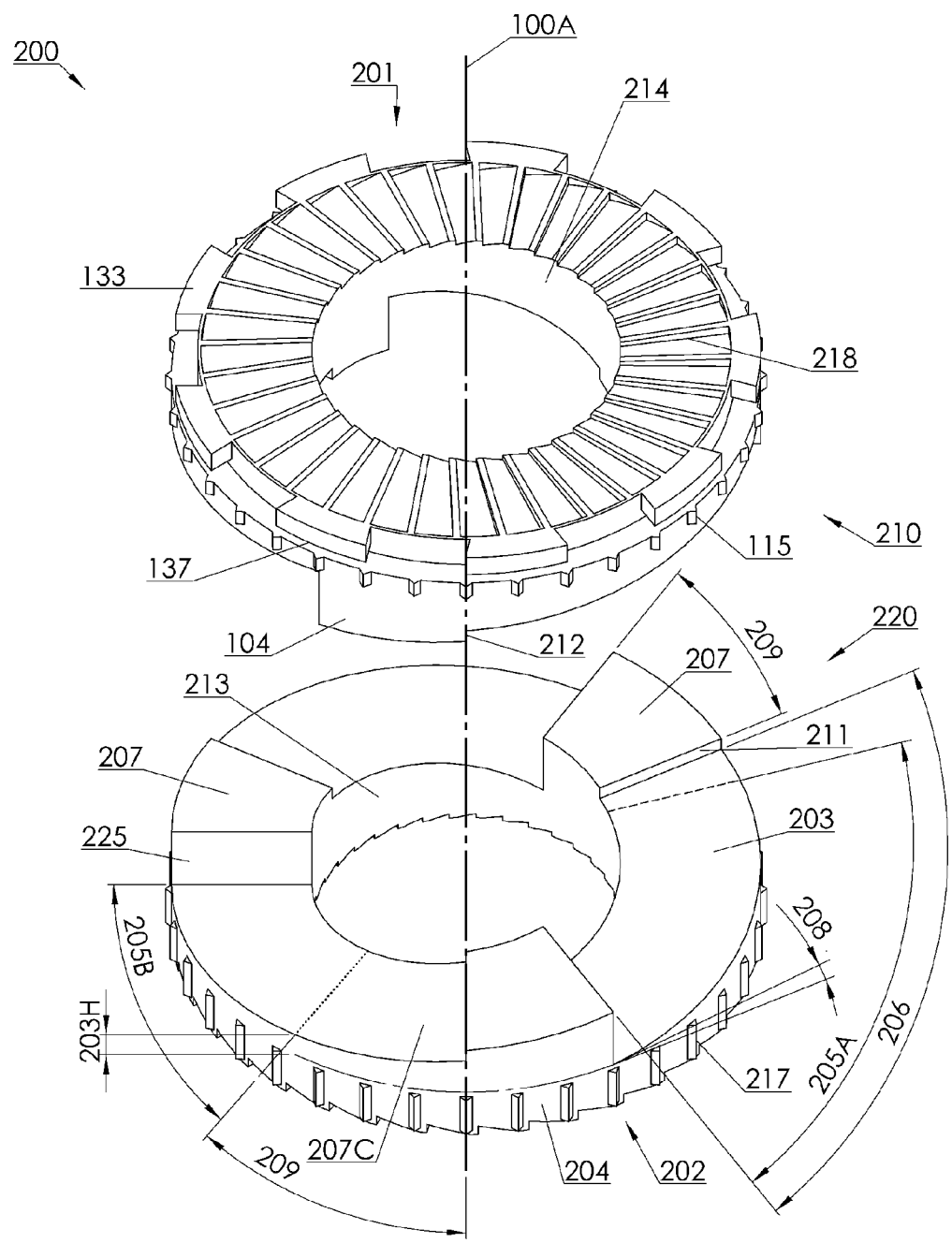
FIG. 2A is the first top down view perspective down view of a reaction washer integrated in an axially reacting washer stack according to a second embodiment of the invention in exploded arrangement.
Figure 2B:
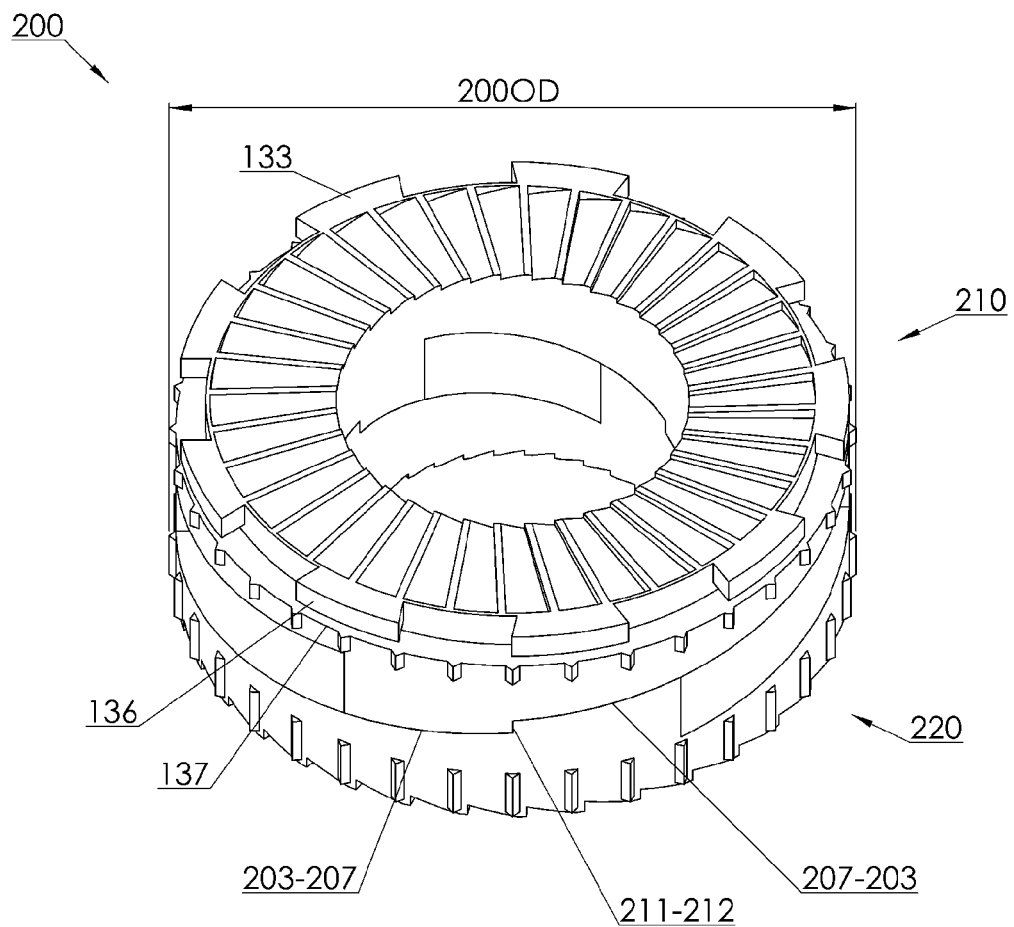
FIG. 2B is the first top down perspective view of the second embodiment reaction washer stack of FIG. 2A in stacked arrangement.
Figure 2C:
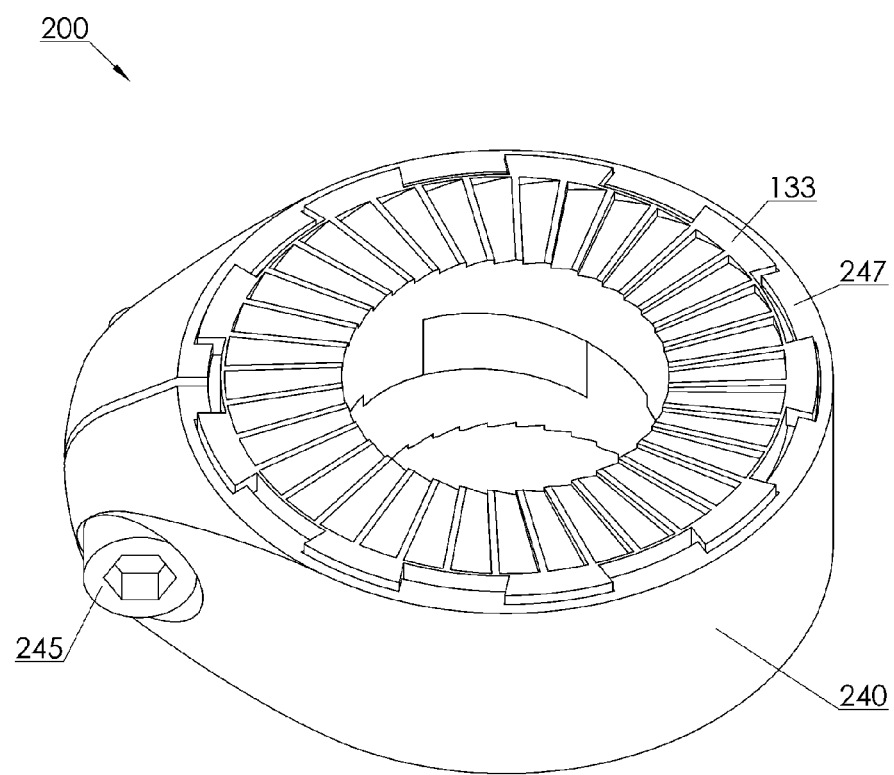
FIG. 2C is the first top down perspective view of the second embodiment reaction washer stack of FIG. 2B including a circumferentially tighten able clamp ring.
Figure 2D:
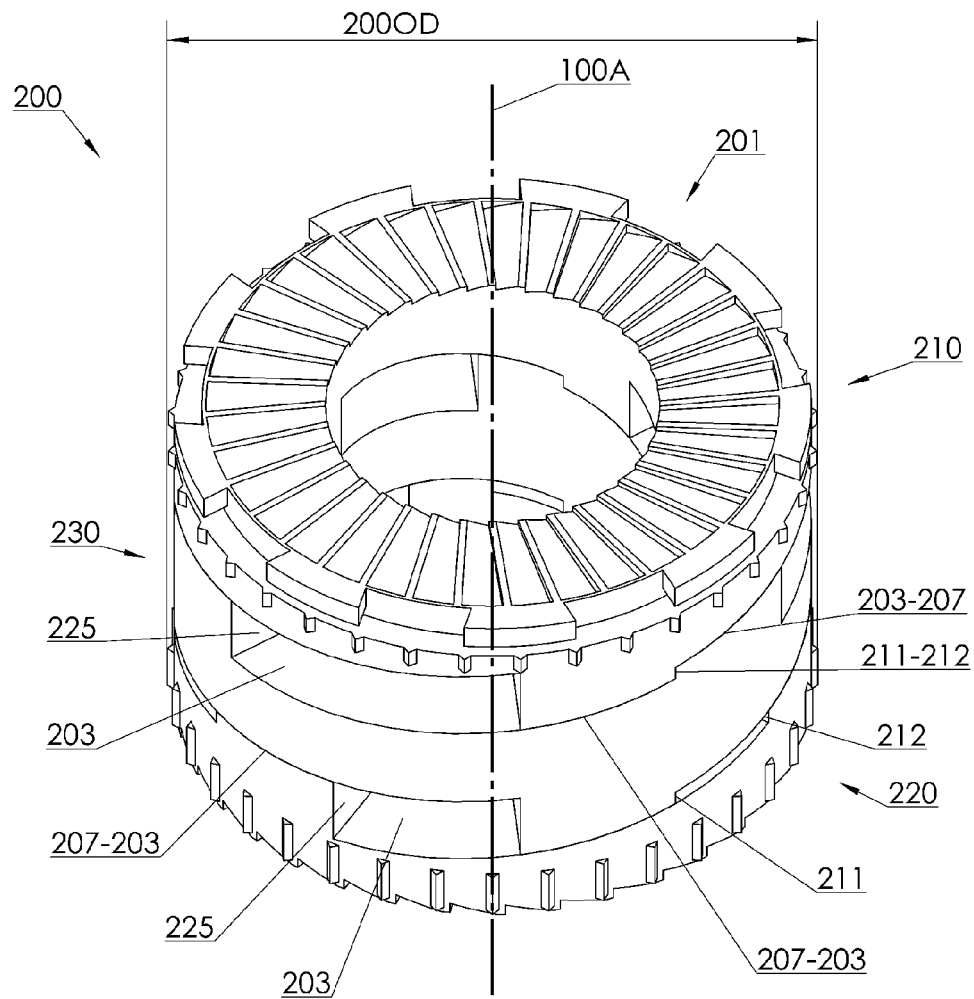
FIG. 2D is the first top down perspective view of the second embodiment reaction washer stack of FIG. 2B including an interposition washer.
Figure 3A:
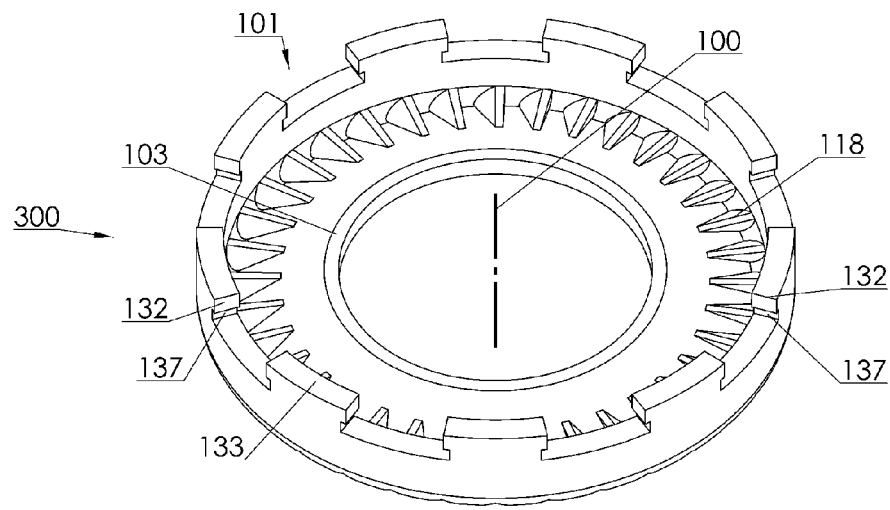
FIG. 3A is the first top down perspective view of a reaction washer with raised tool access castles according to a third embodiment of the invention.
Figure 3B:
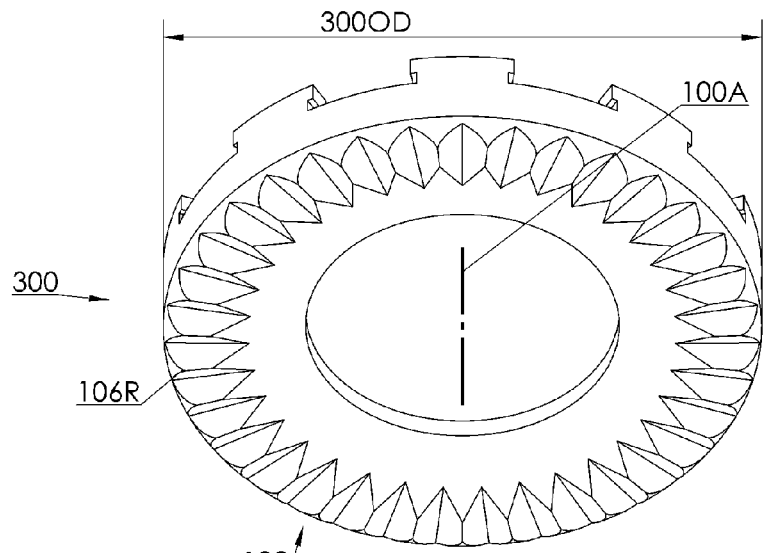
FIG. 3B is the first bottom up perspective view of the third embodiment of the invention of FIG. 3A.
Figure 3C:
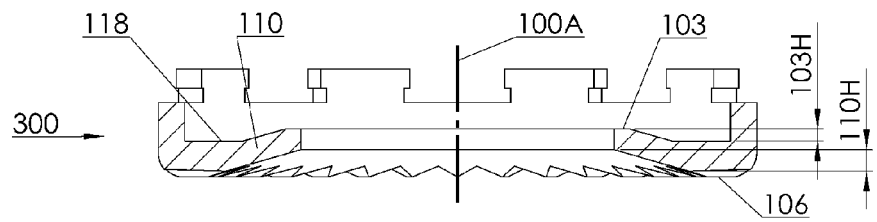
FIG. 3C is a side cut view of the third embodiment of the invention of FIG. 3A.
Figure 7A:
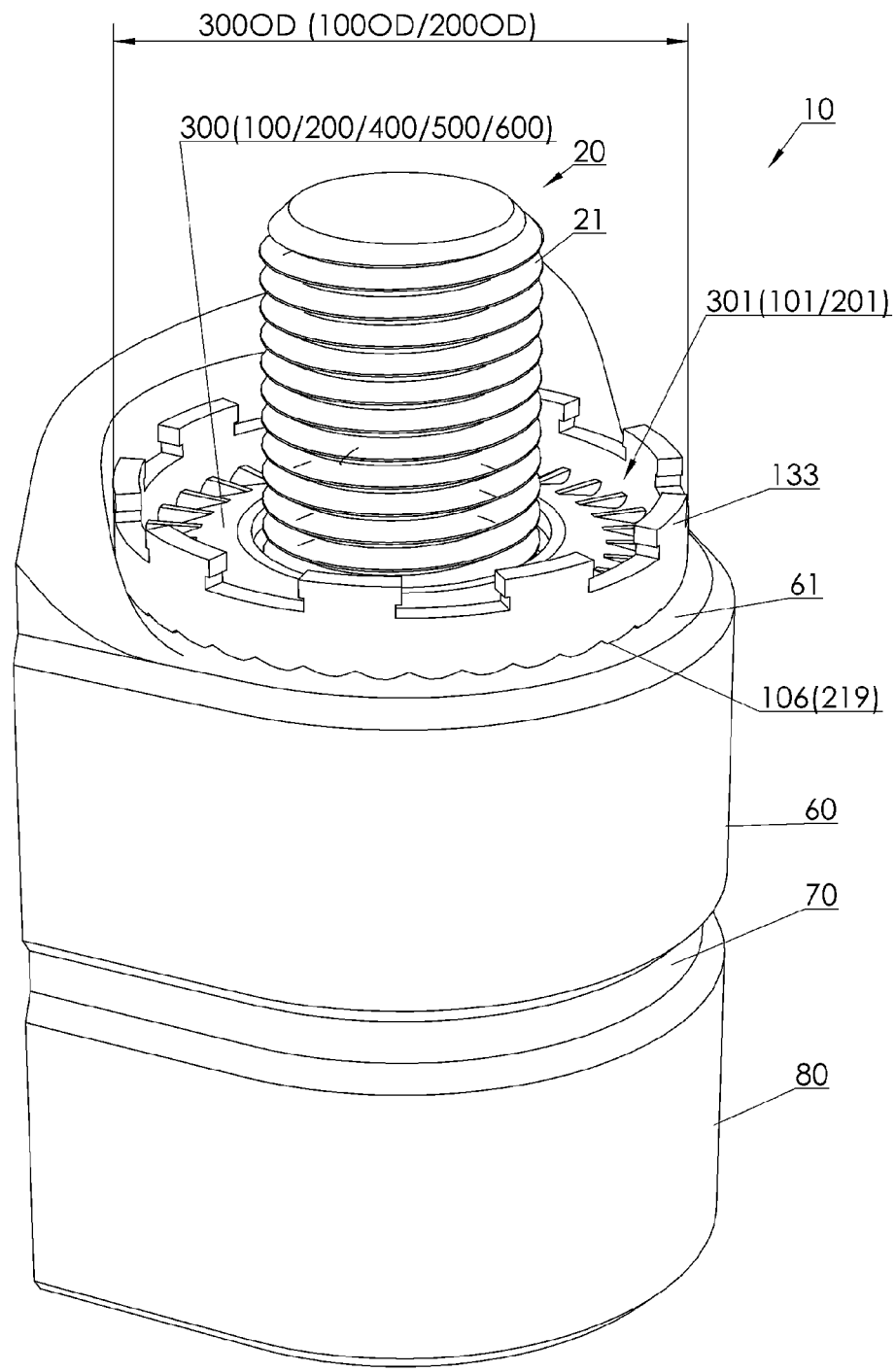
FIG. 7A is a second top down perspective view of the reaction washer of FIGS. 3A-3C placed over a main tightening thread and on a resting surface of a flange and seal assembly to be tightened.
Figure 7B:
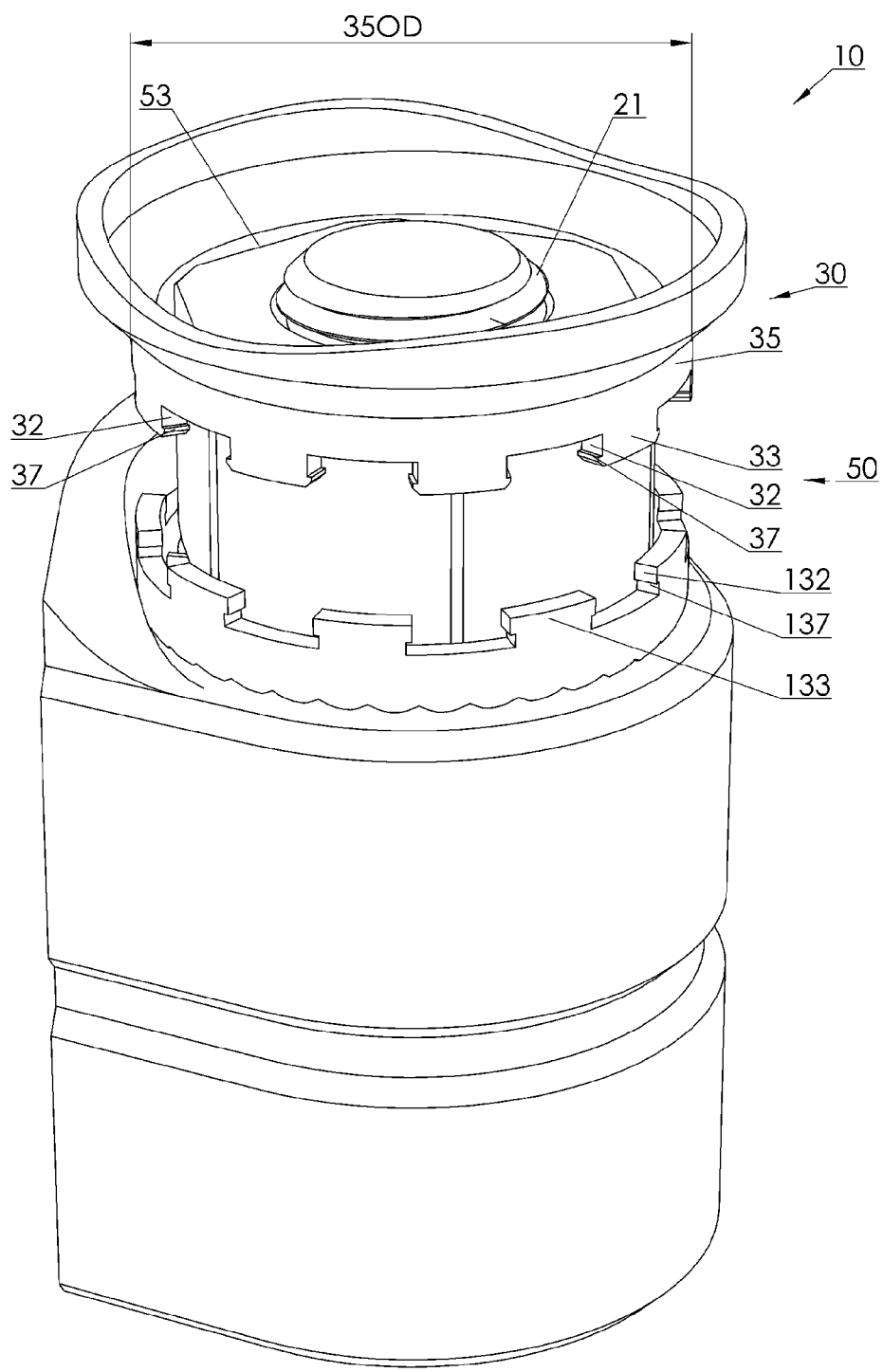
FIG. 7B is the second top down perspective view of FIG. 7A including a tightening element manually screwed on the main tightening thread and pushing onto the reaction washer of FIGS. 3A-3C. A bottom portion of a reaction socket of the present invention is depicted snug encompassing the tightening element with its bottom portion and approaching the tool access castles.
Figure 7C:
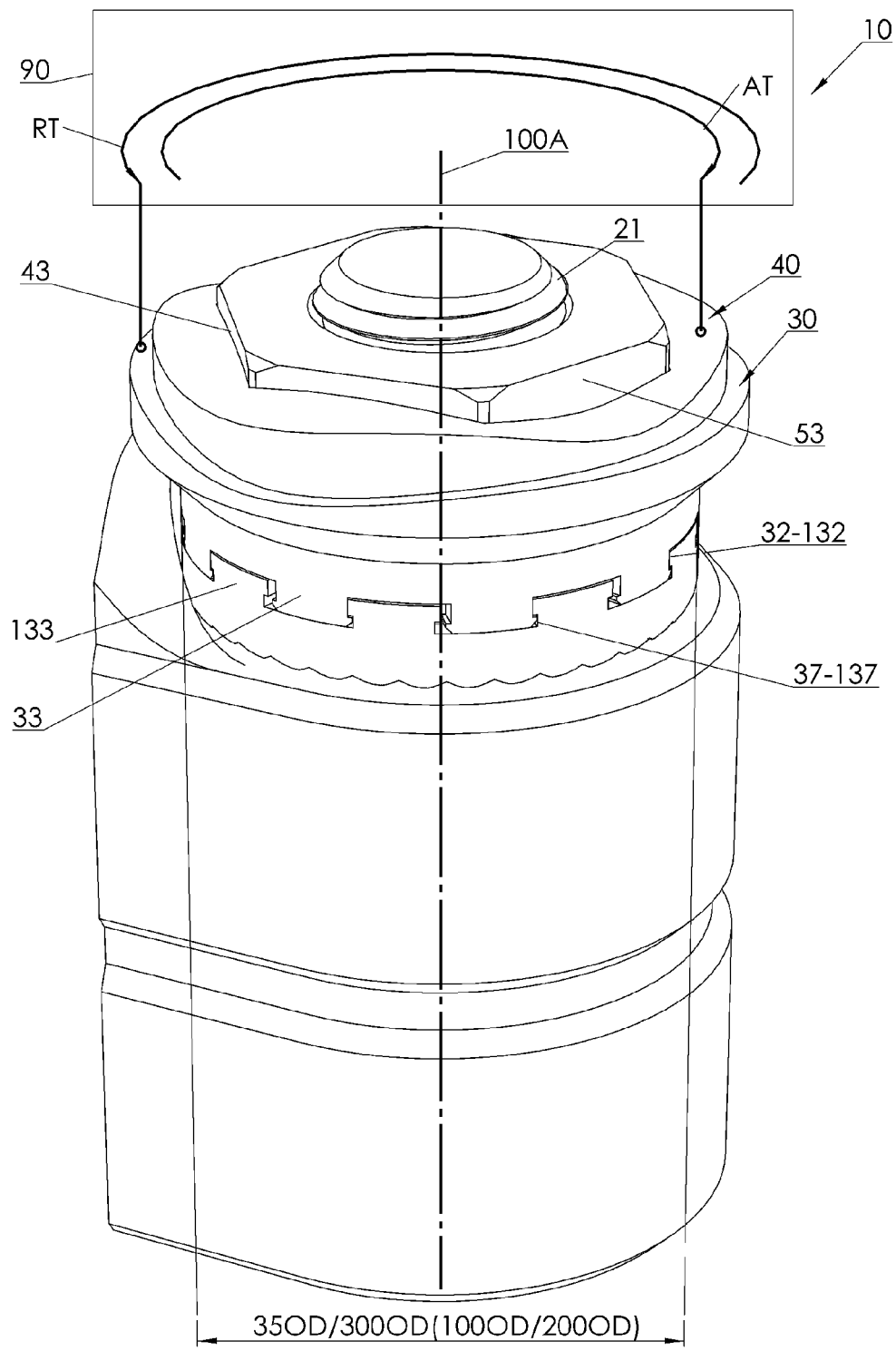
FIG. 7C is the second top down perspective view of FIG. 7B with the reaction socket being reaction torque transmitting coupled with the reaction washer. A bottom portion of an actuation socket is concentric inside the reaction portion and actuation coupled with the tightening element.
Figure 7D:
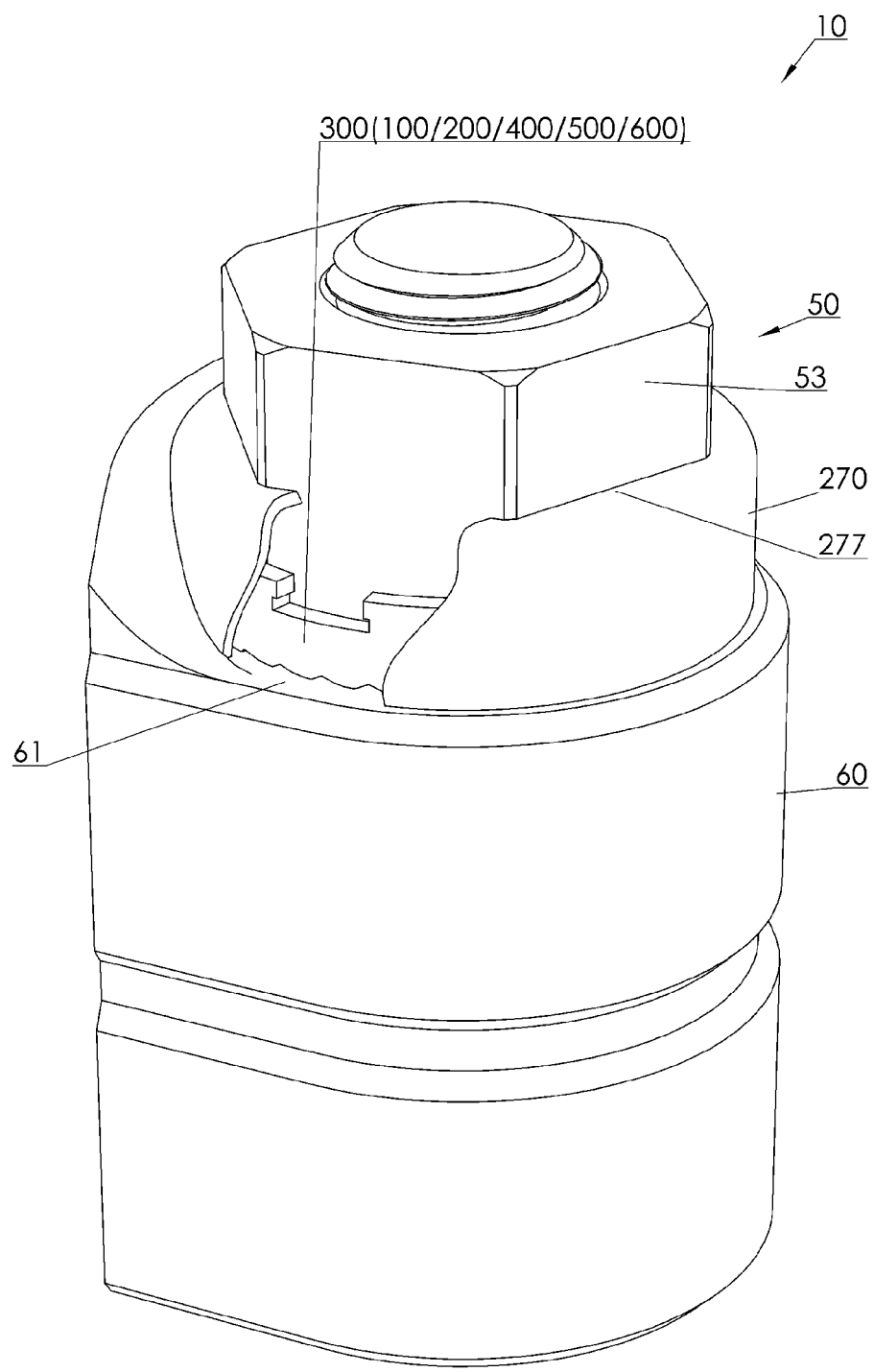
FIG. 7D is the second top down perspective view of FIG. 7C after tightening of the tightening element. The reaction washer and bottom portion of the tightening element are encapsulated by an axially press fitted clamp ring depicted in partial cut view.

The circumferential lock ring may be a circumferential clamp 240 as shown in FIG. 2C, or an axial press ring 270 as shown in FIG. 7D. The circumferential clamp 140 may be circumferentially tightened via a circumferential locking bolt 245 that upon tightening reduces the overall clamp diameter such that it radially engages with and/or is pressed into the lock features 115 and 217. The axial press ring 270 may be axially assembled by initially fitting its coupling cutout 43 over the actuation coupling 53 or by initially pressing it over the peripheral top serrations 115. The axial press ring 270 is secured by further pressing it down over the peripheral bottom serrations 217. The axial press ring 270 may be employed solely to cover the tool access castles 133. In that case it may be pressed into place without employing serrations 115, 217. The reaction washer 100/300 may also feature circumferential serrations 115 to rotationally secure the tightening element 50 on the reaction washer 100/300 via the press ring 270 in case the rotation stop serrations 118 are omitted. The serrations 115, 217 may elastically or plastically deform the circumferential long ring 240/270. To engage with tool access castles as lock features 133, the circumferential lock ring 240/270 may feature clamp coupling 247 correspondingly shaped to the tool access castles 133.

As in FIGS. 7A-7D, the axially reacting washer stack 200/400/500/600 may be part of a nut-bolt assembly 20-50 and/or a tightened assembly 10. The nut-bolt assembly 20-50 may include the tightening element 50 screwed on a mating element such as a thread bolt 20 having a main thread 21. In case of the tightening element 50 being a bolt, the mating element 20 may be a nut or thread hole. In the depicted case of the tightening element 50 being a nut, the mating element 20 may be a bolt or a thread stud. The tightened assembly 10 may include a first tightened structure 60, a second tightened structure 80 and a gasket 70. The mating element 20 may be rotationally secured by any well known means.

Referring to FIG. 7A, an assembly 20-60-70-80 to be tightened has a reaction washer 100/300 or axially reacting washer stack 200/400/500/600 placed on the resting surface 61 around the main tightening tread 21. Next and as in FIG. 7B, a tightening element 50 is initially screwed down without transferring a reaction torque RT since the reaction washer 100/300 or axially reacting washer stack 200/400/500/600 has not bitten into the resting surface 61 yet. This may be done manually. During the initial screwing down, sufficient initial axial load may be established for the reaction washer 100/300 to bite into the resting surface 61. If axial loading and serration bite needs to be applied at higher levels to establish bite and avoid successive slippage, an axially reacting washer stack 200/400/500/600 may be employed.

After initially screwing down the tightening element 50, the reaction socket 30 is slipped over the tightening element 50 and coupled with the tool access castles 133. The actuation socket 40 may at the same time be coupled with the tightening element 50. Both sockets 30,40 may be attached to and rotated with respect to each other by the power torque wrench 90. Latest the moment a reaction torque RT is exerted via the reaction socket 30, the lock-in hooks 37 engage with the lock-on grooves 137 and axially secure the reaction socket 30 and power torque wrench 90 before the reaction torque RT is transferred onto the tool access castles 133.

In case of a reaction washer 100/300 already bitten into the resting surface 61, the reaction torque RT is transferred directly onto the resting surface 61 while the tightening element 50 is rotated by the actuation torque AT. In case of an axially reacting washer stack 200/400/500/600, the reaction torque RT may rotate the top washer 210/300/310 initially until the washer stop level is reached. At least one of the helical ramp 203 and the ramp mate 207 may have a low friction surface such that the friction between helical ramps 203 and respective ramp mates 207 is substantially below the friction between the support washer bottom serrations 219 and the resting surface. At that moment the top washer 210/310/300 stops and the tightening element 50 continues to rotate. Once a predetermined tightening torque is reached, the sockets 30,40 are removed and the reaction washer 100/300 or axially reacting washer stack 200 may be secured by the clamp ring 240/270.

Figure 6A:
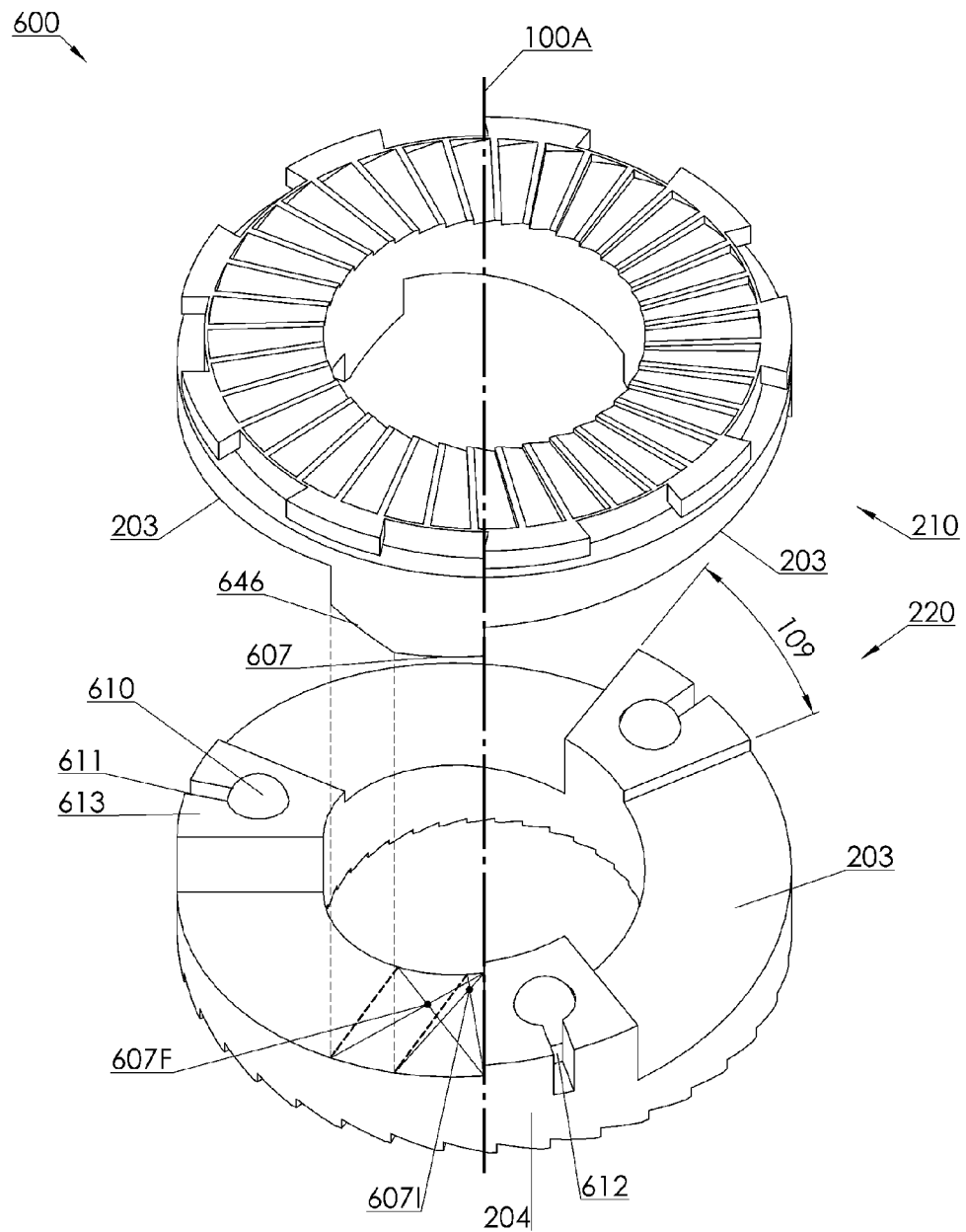
FIG. 6A is the first top down perspective view of a reaction washer integrated in an axially reaction washer stack in exploded arrangement with integrated rotation lift stop, ramp indenters and squirting direct tension indicators according to a seventh embodiment of the invention.
Figure 6B:
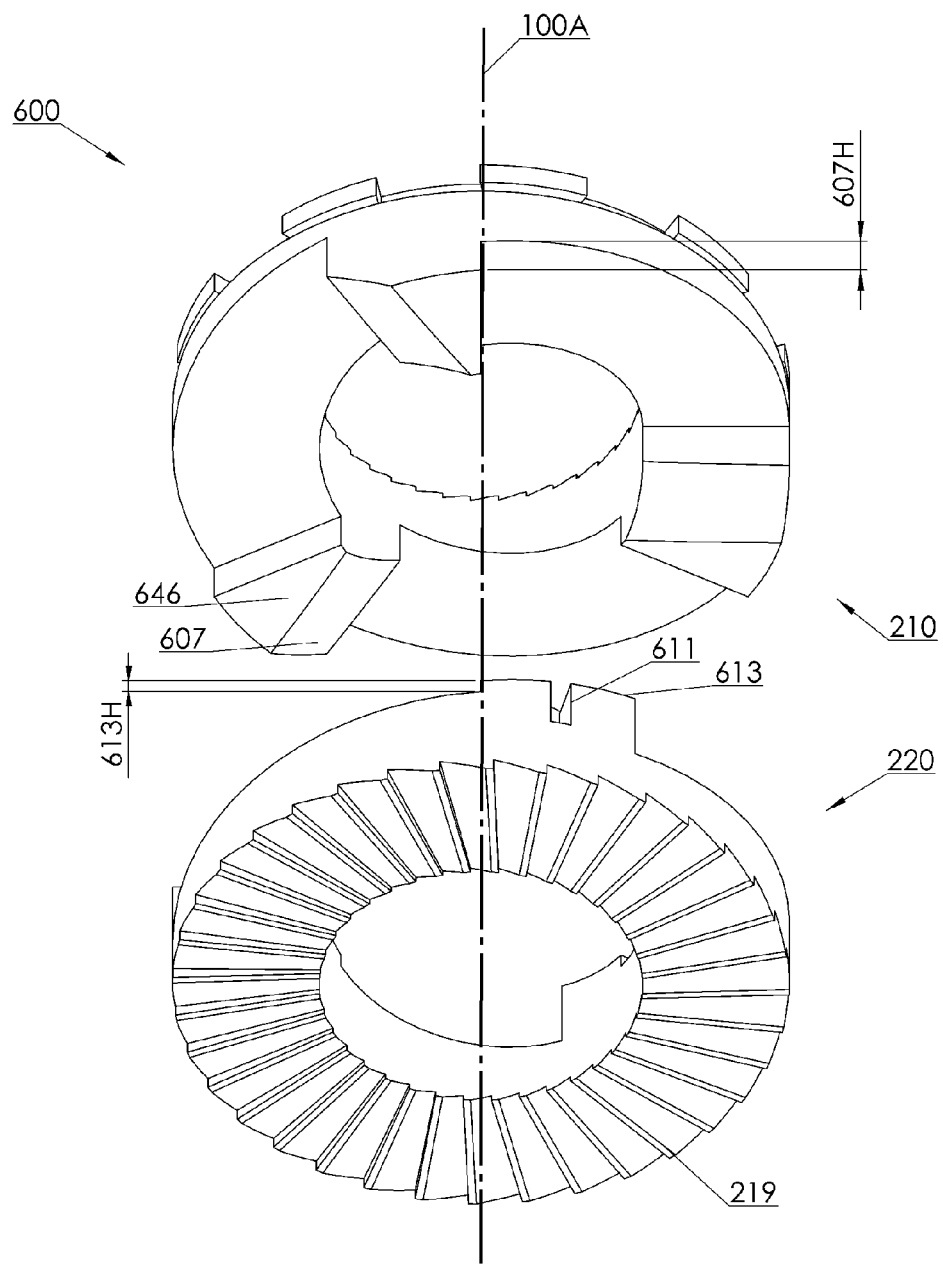
FIG. 6B is the first bottom up perspective view of FIG. 6A.

In the axially reacting washer stacks 500/600 of FIGS. 5, 6A-6D, the interface rotation lock between top and support washers 210, 220 may be a ramp indenter 508 that is embedded on a ramp mate 207 or that is integral part of an indenter ramp mate 607. Thereby, the ramp indenters 508/607 are indenting into an opposite other helical ramp 203 once the washer stop level is reached and the axially reacting washer stack 500/600 is axially fully loaded. For that purpose, the ramp indenter 508,607 may be substantially harder than the helical ramp 203 it is intended to indent. The pressed in indenters 508/607 secure the position of the top washer 210 on the support washer 220. Ramp indenters 508/607 may also be employed in conjunction with an interposition washer 230 as shown in FIG. 6E. The interposition washer 230 may thereby be made as a sacrificial low cost part entirely from material that is substantially softer than top washer 210 and support washer 220. The embedded ramp indenters 508 may be a bearing body such as a bearing ball or a bearing cone and may be rotationally rigid or free embedded. Rotationally free indenters 508 may assist in reducing the friction on the helical ramp 203 down to a level such that at the washer stop level the corresponding axial load and corresponding reaction torque transferring friction is substantially increased. As a favorable result and due to the low rolling friction of the rolling indenters 508 in the torsion lift interface 203-207/203-203, the washer bottom 202/402 may be provided flat and without bite features 106/219 and still provide sufficient contact friction for slip free transfer of reaction torque RT. This may be of particular advantage where the resting surface 61 is hardened or may need to be kept without bite marks.

A direct tension indicator may be part of an axially reacting washer stack 600 by means of an indentation stop mate 613 that raises above an adjacent helical ramp 203 by an indentation stop height 613H. The indentation stop height 613H is lower than an indenter height 607H by a predetermined amount, such that the indention stop mate 613 comes into contact with a respective opposite helical ramp 203 at a predetermined indentation depth 607D and corresponding indentation load of the ramp indenter into it respective opposite helical ramp 203. To assist in predetermining washer stack load and corresponding indentation depth 607D, an indentation ramp 646 may be employed such that an indentation area of the ramp indenter 607 increases gradually from an initial indentation area 6071 to a final indentation area 607F as shown in FIG. 6A.

In conjunction with the ramp indenter 508/607, an indentation depth squirt indicator 610-611-612 may be embedded on the indentation stop mate 613, which in turn may be part of the top washer 210, support washer 220, and/or interposition washer 230. Part of the indentation squirt indicator 610-611-612 may be a well known squirting medium 612 that is squirted away from the axially reacting washer stack

Figure 6C:
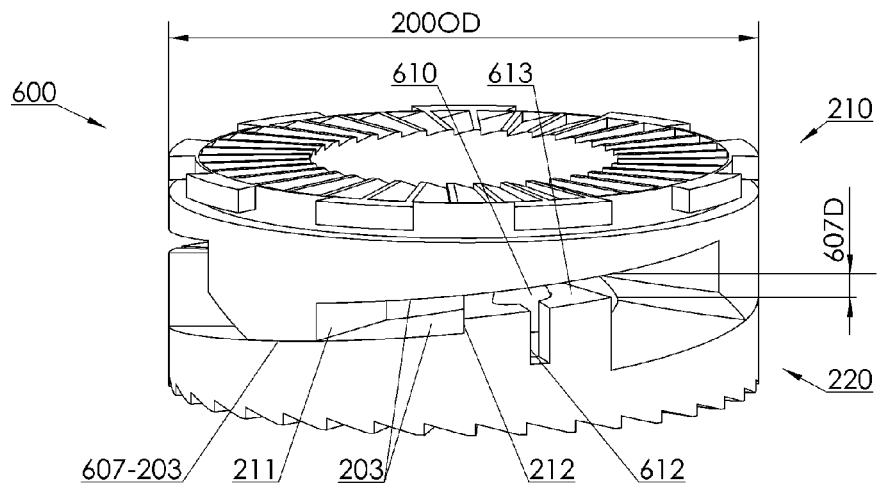
FIG. 6C is a third top down perspective view of the axially reacting washer stack of FIGS. 6A, 6B in stacked arrangement prior to being loaded.
Figure 6D:
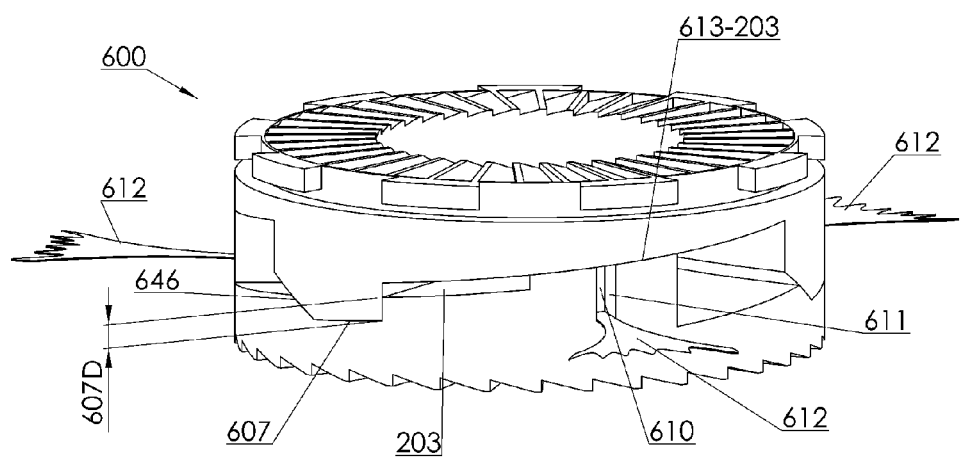
FIG. 6D is the third top down perspective view of the axially reacting washer stack of FIGS. 6A, 6B in stacked arrangement after being loaded.
Figure 6E:
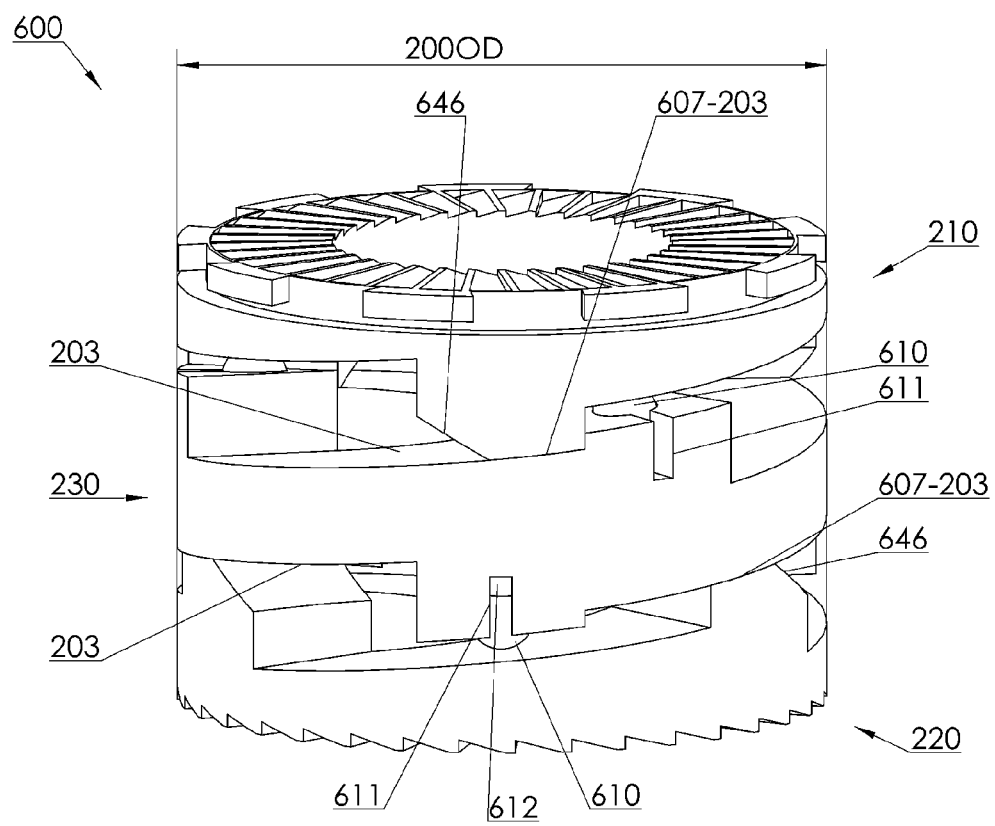
FIG. 6E is the third top down perspective view of the axially reacting washer stack according to an eight embodiment of the invention.

600 by a squirt plunger 610 through a squirt channel 611 while the ramp indenter 508/607 is indented into its predetermined indentation depth 607D as shown in FIGS. 6C,6D.

During loosening of the tightening element 50 and once the eventual clamp ring 240/270 is removed, the axially reacting washer stack 200/400/500/600 may assist in ramping down axial thread load and lock friction by the top washer 210 initially sliding down the helical ramp 203. In case of ramp indenters 508/607, their indentation profile and/or indentation ramp 646 angle may be selected for a predetermined snap-free torque at which the indenter 508/607 becomes loose on the helical ramp 203 it has indented on.

In a test setup, a basic axially reacting washer stack 200 including a torsion lift interface 203-203 was placed on a resting surface 61 made of mild steel. The axially reacting washer stack 200 had an inner diameter of about 2.8 inches and an overall outer diameter 200OD of about 4 inches. Both washers 210,220 were made of steel hardened to about 63 HRC+/−2 HRC. The ramp angle 208 was about 8 deg. A molybdenum based grease was applied on the resting surface 61 to simulate maximum adverse slipping conditions. A nut 50 was initially manually screwed on a bolt thread 20 extending through the axially reacting washer stack 200. Once the nut 50 was snug contacting the washer top 201, a concentric socket tool 30-40 attached to a power torque wrench 90 was coupled with the nut 50 and top washer 210. At the begin of the reaction coupled tightening, the top washer 210, reacting socket 30 and power torque wrench 90 rotated about 5 deg around the tightening axis 100A with respect to the support washer 220 before the top washer 210 reached the washer stop level. Immediately after the top washer 210 stopped, the nut 50 continued to rotate in the opposite direction around the tightening axis 100A until a predetermined torque of 1500 ft-lbs was applied. No slippage of the support washer 220 on the greased resting surface 61 was observed during this reaction coupled tightening.

Accordingly, the scope of the present invention described in the Figures and Specification above is set forth by the following claims and their legal equivalent:

What is claimed is:

1. A reaction washer comprising:
   a) a washer axis;
   b) a top face;
   c) a number of tool access castles that are circumferentially arrayed with respect to said washer axis and that are extending away from said top face and within and up to an outer washer diameter of said reaction washer;
   d) a lock-on groove that is circumferentially at least partially undercutting at least one of said access castles and that is encompassing said reaction washer; and
   e) a bottom face that is radially extending up to the said washer outer surface.

2. The reaction washer of claim 1, wherein at least one of said number of tool access castles is extending downward away from said top face.

3. The reaction washer of claim 1, further comprising a number of bite spikes circumferentially arrayed on a bottom face of said reaction washer.

4. The reaction washer of claim 1, further comprising a number of rotation stop serrations that are positioned on said top face below and surrounding a central bushing face.

\* \* \* \* \*